United States Patent Office 2,717,104
Patented Sept. 6, 1955

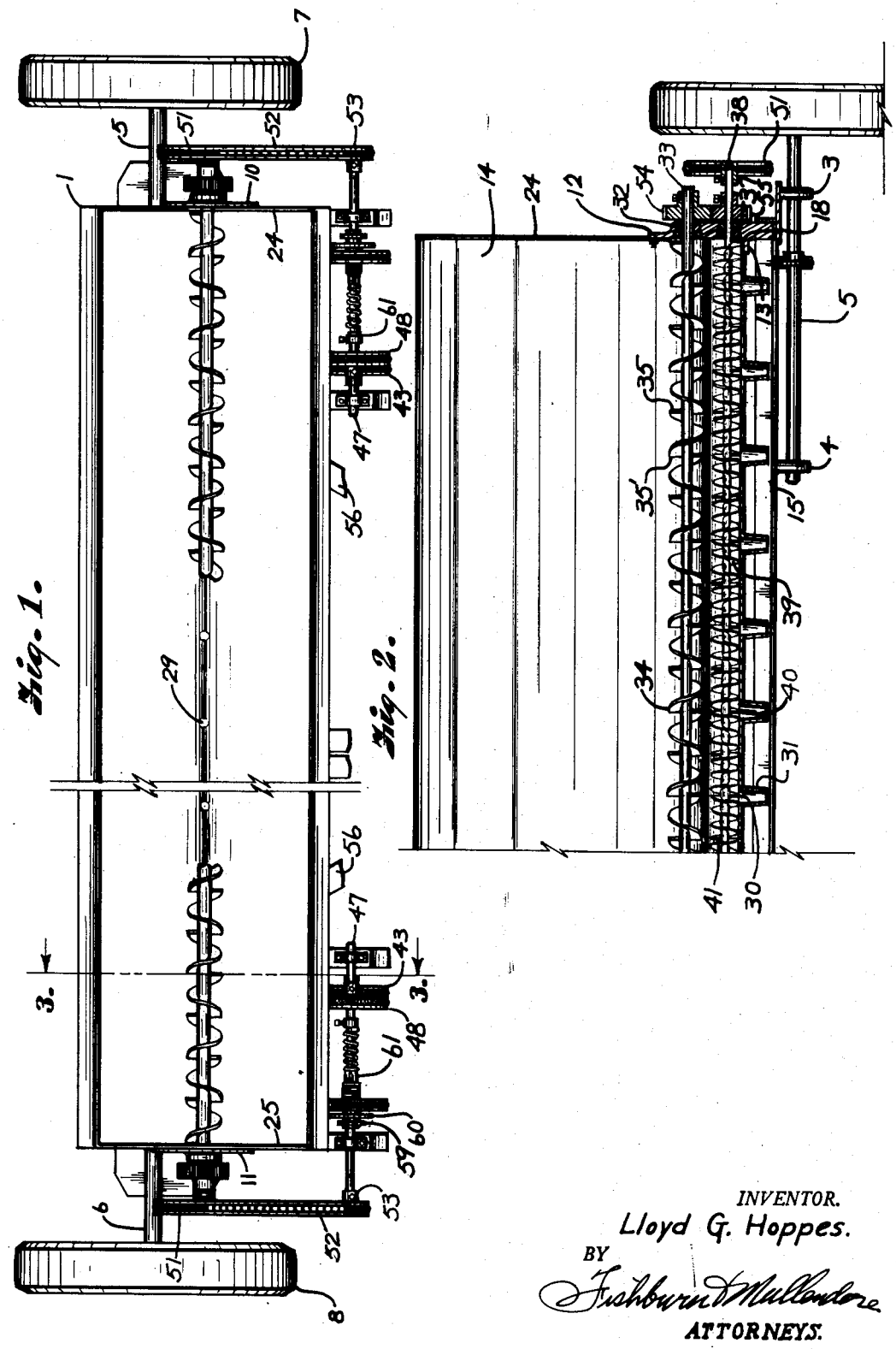

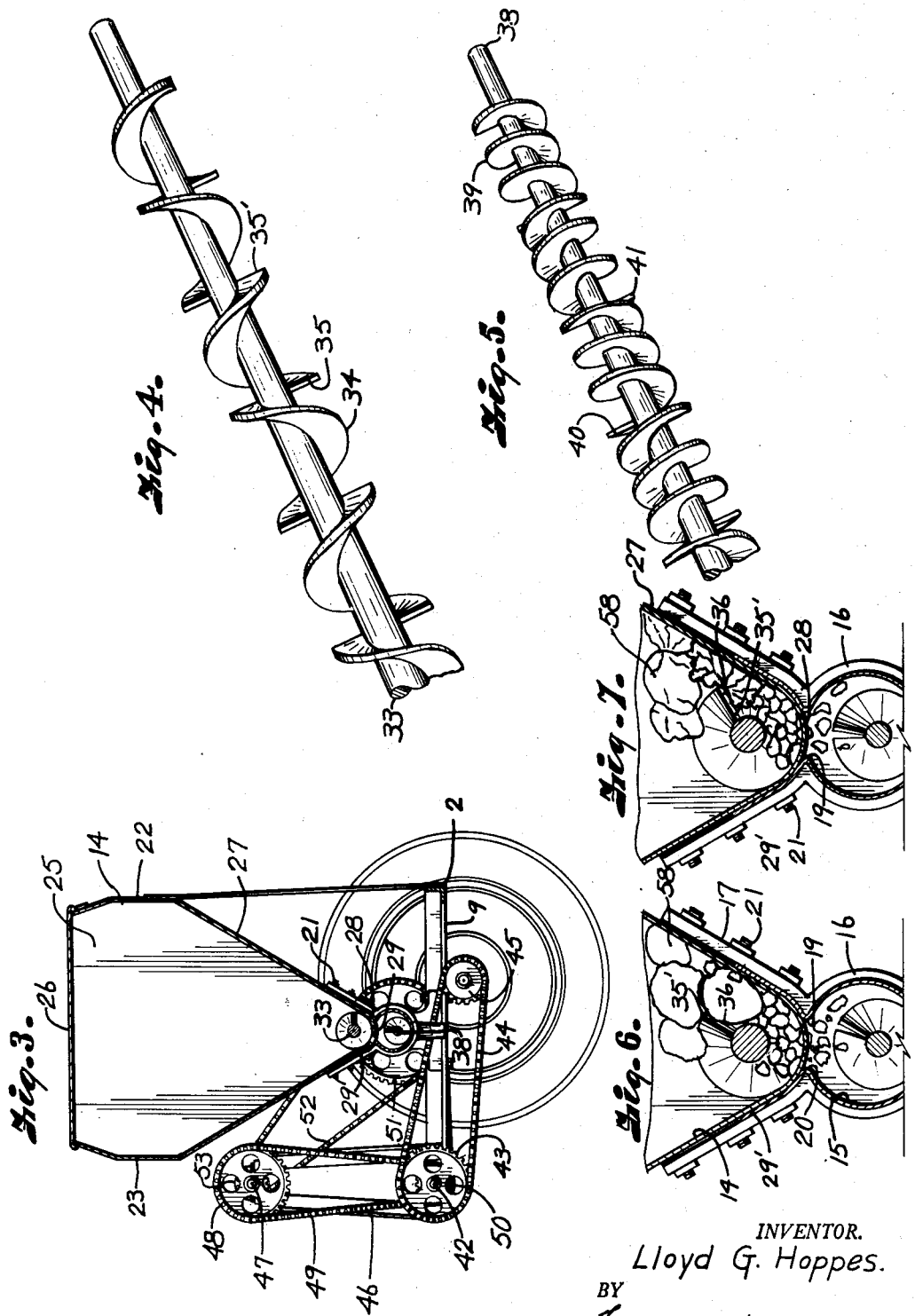

2,717,104

FERTILIZER SPREADING MACHINES

Lloyd G. Hoppes, Hazelton, Kans., assignor, by mesne assignments, to Lester Wilkinson, Wichita, Kans., as trustee Application November 1, 1951, Serial No. 254,229

5 Claims. (Cl. 222—177)

This invention relates to new and useful improvements in apparatus for spreading commercial fertilizer or the like.

The principal objects of the present invention are to provide a wheel borne frame with a hopper thereon, the hopper having inclined walls converging downwardly and terminating in a curved bottom having spaced openings longitudinally thereof and having a shaft mounted longitudinally of the hopper provided with a plurality of oppositely threaded spiral augers having the ends of some of the flights terminating over the spaced openings and other ends of the flights terminating intermediate thereof whereby the terminating edges of said flights will contact lumps appearing in the fertilizer and crush the same against the inclined walls of the hopper; to provide the shaft in the hopper with oppositely threaded flights arranged relative to the openings whereby rotation of the shaft effects feed of fertilizer toward the respective openings from each side thereof; to provide a longitudinal cylindrical housing below said hopper having a shaft rotatably mounted therein provided with oppositely threaded spiral augers with the ends of some of the flights terminating over openings in the bottom of said housing and the other ends of said flights terminating substantially under the openings in the hopper for moving the fertilizer in opposite directions from said hopper openings, said flights metering and forcing the fertilizer in regulated amounts through the openings in the housing; to provide driving connection of said shafts with the axle shafts of the wheels of said apparatus; to provide regulation of speed of rotation of said shafts in said hopper and housing to regulate the feed of fertilizer from said housing; to provide clutch mechanism for said driving mechanism; to provide such mechanism with means for rotating said augers in the hopper and housing in the opposite direction; and to provide a device of this character especially adapted for spreading of fertilizer commercially over large areas.

In accomplishing these and other objects of the invention, I have provided improved details of structure, the preferred form of which is illustrated in the accompanying drawings, wherein:

Fig. 1 is a top plan fragmentary view of my invention particularly illustrating the auger in the hopper with adjacent sections of the flights thereof threaded in opposite directions on the shaft.

Fig. 2 is a fragmentary sectional view through the device particularly illustrating the auger in the hopper and the auger in the housing.

Fig. 3 is a cross-sectional view taken on the line 3—3, Fig. 1, particularly illustrating the driving mechanism.

Fig. 4 is a fragmentary elevational view of the top auger.

Fig. 5 is a fragmentary elevational view of the lower auger.

Fig. 6 is an enlarged cross-sectional view through the device particularly illustrating the end of the flight on the top auger engaging a lump of fertilizer.

Fig. 7 is an enlarged cross-sectional view through the device particularly illustrating the terminating point of the flight on the top auger as it crushes the lump of fertilizer.

Referring more in detail to the drawings:

1 designates a fertilizer spreader embodying the features of my invention comprising a frame 2 upon which is mounted suitable bearings 3 and 4 for axles 5 and 6 for mounting of wheels 7 and 8 for supporting the fertilizer spreader.

Mounted on the ends 9 of the frame 2 by suitable means are brackets 10 and 11. The brackets are provided at their upper ends with flanges 12 and inwardly directed flanges 13 (Fig. 2) for supporting a hopper 14 and housing 15 as presently described.

The inwardly directed flanges 13 on the brackets 10 are cylindrical in shape as indicated at 16 (Fig. 6) and have upwardly and outwardly extending portions 17 to which the housing 15 and hopper 14 are secured. The housing 15 is substantially cylindrical in shape and its ends engage in the cylindrical flanges 13 of the brackets as indicated at 18 (Fig. 2). The upper portion of the walls of the cylindrical housing are spaced apart as indicated at 19 (Fig. 6) and the walls turn sharply upwardly and outwardly forming shoulders 20 at the respective upper sides of the housing.

The hopper 14 is connected to the upwardly directed flanges of the brackets by bolts or the like 21. The hopper comprises sides 22 and 23 and ends 24 and 25. A top 26 is provided for the hopper and hingedly connected thereto as is the usual practice. The sides 22 and 23 are inclined and converged downwardly as indicated at 27 (Fig. 3) terminating in a curved bottom 28 provided with a plurality of spaced openings 29 longitudinally of said bottom and opening into the housing 15. Formed integrally with the housing 15 above the shoulders 20 are extensions 29' forming side portions extending alongside the lower portions of the tapered sides 22 and 23 to strengthen said portions.

The housing 15 is provided in its bottom with a plurality of openings 30 longitudinally of said housing and in staggered relation with the openings 29 in the hopper for a purpose later described. Circling the openings 30 and mounted on the bottom of the housing by welding or other suitable means are short spouts 31 adapted to receive flexible chutes or the like (not shown) for depositing the fertilizer in the soil.

The brackets 10 and 11 are provided with suitable bearings as indicated at 32 (Fig. 2) and mounted therein is a shaft 33 extending longitudinally of the bottom of the hopper but spaced therefrom as best illustrated in Fig. 3. Mounted on the shaft 33 is a plurality of pairs of auger screw sections 34 having their flights or spirals terminating in substantially straight edges 35 and the flights are oppositely threaded so that said straight edges 35 of a pair of flights will terminate over the respective openings 29 in the bottom of said hopper for feeding of the fertilizer material in the hopper from both sides to said openings. The respective auger sections are so situated on the shaft 33 that the straight edges 35 will alternate in reaching the openings 29 so that a continuous feed will be provided to said openings. The respective auger sections are of a length to also terminate midway between the openings 29 so that should there be any lumps in the fertilizer material, the straight edges 35' will contact such lump as indicated at 36 (Fig. 6) and crush the same against the inclined walls 27 of the hopper as illustrated in Fig. 7. The crushed material is then picked up by the adjacent augers and delivered to the next openings where it is fed to the cylindrical housing 15. The edges 35 of the flights also aid in the crushing and grinding of the lumps.

Suitable bearings 37 are provided in the lower portion of the brackets 10 and 11 for mounting of a shaft 38 longitudinally of said housing and mounted upon said shaft is a plurality of pairs of auger screw sections 39 terminating in straight edges 40 and 41 (Fig. 5). As in the upper auger section arrangement the terminating straight edges 40 and 41 extend to substantially midway of the openings 30 in the housing and the augers are oppositely faced so that the material in the housing is fed from both directions to the openings, the terminating points being alternated so that a continuous flow of the material is provided to the openings upon rotation of the shaft. It will be noted that in the auger arrangement in the hopper, the flights of the augers 34 are a substantial distance apart to receive the material and provide for terminating points 35 and 35' for crushing and grinding of the material in the hopper, whereas in the cylindrical housings, the flights of the auger are closer together and they extend substantially three complete revolutions of the shaft, but the outer ends of each oppositely threaded auger section terminates over an opening in the bottom of the housing, the same as in the upper auger section arrangement. The upper and lower auger sections are such that the upper auger moves more fertilizer in one revolution than the lower auger and thereby provides agitation in the hopper. The lower auger meters the fertilizer delivered.

The frame 2 of the device extends forwardly of the hopper as illustrated in Fig. 3 and mounted on the forward portion of the frame near the respective ends thereof are short shafts 42 upon which gears 43 are mounted over which chains 44 run to driving gears 45 on the axles 5 and 6. As the identical driving mechanism is provided at each end of the device, only one will be described. Brackets 46 are mounted on the forward portion of the frame 2 and extend upwardly for mounting of a jack shaft 47 provided with a gear 48 accommodating a chain 49 leading to a sprocket 50 on the short shaft 42. The shaft 38 extending through the housing extends outwardly from the respective ends of the brackets 10 and 11, and mounted upon the outer ends thereof is a sprocket 51 accommodating a chain 52 leading to a sprocket wheel or gear 53 mounted upon a jack shaft 47. The ends of the shaft 33 in the hopper also extend outwardly from the brackets 10 and 11 and mounted on the respective shafts 33 and 38 are spur gears 54 and 55 meshing with each other.

The framework structure includes forwardly extending brace members 56 and mounted on the forward ends thereof is a suitable connection (not shown) for a tractor or the like (also not shown) for propelling the device over the ground.

Operation of the fertilizer spreader constructed and assembled as described is as follows:

The desired quantity of fertilizer material 58 is placed in the hopper 14, and movement of the device over the ground will cause the drive mechanism on the axle shafts to rotate the sprockets 43 and through chain connection 44, and the chain connection 49 with the smaller sprocket 50 on the shaft 42 having connection with the larger sprocket 48 will rotate the jack shaft 47, and the chain connection 52 with the smaller sprocket 53 on the jack shaft will cause the larger sprocket 51 on the shaft 38 extending through the housing 15 to rotate and cause the spur gear 55 to mesh with spur gear 54 to rotate such gear on the shaft 33. It will be noted that the auger in the housing 15 will be operated in an anti-clockwise direction whereas the auger in the hopper will operate in a clockwise direction (Fig. 3).

Rotation of the augers in the hopper will feed the material through the openings 29 to the housing 15 and, as above stated, the ends of the flight terminate over such openings and the straight edges 35 and 35' of the auger sections will crush the material against the side of the hopper so that it will be fed through the opening 29. The openings 30 in the housing are in staggered relation to the opening 29. The auger sections in the housing will pick the material up and take it in both directions until it reaches the openings 30 in the housing to feed it through the spouts and flexible chutes to the soil as desired.

The straight edges of the flights of the augers in the housing extend midway over such openings and the ends of facing flights alternate in reaching such openings so that a continuous feed of material will be supplied to such openings. The housing is kept substantially full of material and rotation of the auger therein will cause the material to be ground against the shoulders 20 at the upper edges of the housing to further pulverize the material therein so that it will be fed through the openings.

The gear arrangement is such that the auger in the hopper 14 rotates at a slower rate than the auger in the housing 15. The openings 29 in the hopper are substantially smaller than the openings in the housing, the flights being spaced farther apart in the hopper, thus having a longer lead and the material will be fed to the housing at a faster rate of speed so as to keep the housing substantially full at all times. Should one of the openings in the hopper become clogged, there will be enough material fed through other openings to maintain sufficient fertilizer in the housing so that a continuous flow of the material will be supplied through the openings in the housing.

The jack shaft 47 is provided with a plurality of different sized sprockets as indicated at 59 and 60 so that the chain 52 may be run to such sprockets to regulate the speed of the augers to regulate the amount of fertilizer material to be fed to the soil.

The jack shaft is also provided with clutch mechanism as indicated at 61 (Fig. 1) for throwing the feed mechanism out of gear when the device is not in use and for transportation.

What I claim and desire to secure by Letters Patent is:

1. A fertilizer distributing apparatus comprising, a hopper having inclined walls converging downwardly terminating in a downwardly curved bottom, said bottom having a plurality of longitudinally spaced openings, a substantially cylindrical shaped housing extending longitudinally under the bottom of said hopper, said housing having its free ends turned upwardly at an angle and a longitudinal opening extending over the openings in the bottom of said hopper, said housing having a plurality of longitudinally spaced openings in the bottom thereof in staggered relation to the openings in the bottom of the hopper, a shaft rotatably mounted in the hopper, a plurality of oppositely threaded auger screw sections mounted on said shaft, the ends of each auger screw section terminating in substantially straight edges and one end of each section terminating over the openings in said hopper and in staggered relation with each other, the opposite ends of said sections terminating substantially midway between said openings, the substantially straight edges of said sections being so arranged as to contact and crush lumps of material against the sides of said hopper, a shaft rotatably mounted in said housing below said hopper, a plurality of oppositely threaded auger screw sections mounted on the shaft in said housing, the ends of each auger screw section terminating over the openings in said housing and in staggered relation with each other, and means for rotating the upper and lower auger sections, the lower auger screw rotating at a slightly greater speed than the upper auger screw and the upper screw having longer leads to move the fertilizer faster than the lower auger to keep the housing substantially full.

2. A fertilizer distributing apparatus comprising, a hopper having inclined walls converging downwardly terminating in a downwardly curved bottom, said bottom having a plurality of longitudinally spaced openings, a substantially cylindrical shaped housing extending longitudinally under the bottom of said hopper, said housing having its free ends turned upwardly at an angle and a longitudinal opening extending over the openings in the bottom of said hopper, said housing having a plurality of longitudinally spaced openings in the bottom thereof in staggered relation to the openings in the bottom of the hopper, a shaft rotatably mounted in the hopper, a plurality of oppositely threaded auger screw sections mounted on said shaft, the ends of each auger screw section terminating in substantially straight edges and one end of each section terminating over the openings in said hopper and in staggered relation with each other, the opposite ends of said sections terminating substantially midway between said openings, the substantially straight edges of said sections being so arranged as to contact and crush lumps of material against the sides of said hopper, a shaft rotatably mounted in said housing below said hopper, a plurality of oppositely threaded auger screw sections mounted on the shaft in said housing, the ends of each auger screw section terminating in substantially straight edges and one end of each section terminating over the openings in said housing and in staggered relation with each other, and means for rotating the upper and lower auger screws, the lower auger screw rotating at a slightly greater speed than the upper auger screw and the upper screw having longer leads to move the fertilizer faster than the lower auger to keep the housing substantially full.

3. A fertilizer distributing apparatus comprising, a hopper having inclined walls converging downwardly terminating in a downwardly curved bottom, said bottom having a plurality of longitudinally spaced openings, a substantially cylindrical shaped housing extending longitudinally under the bottom of said hopper, said housing having its free ends turned upwardly at an angle and a longitudinal opening extending over the openings in the bottom of said hopper, said free ends of the housing extending upwardly along the inclined sides of said hopper, said housing having a plurality of longitudinally spaced openings in the bottom thereof in staggered relation to the openings in the bottom of the hopper, a shaft rotatably mounted in the hopper, a plurality of oppositely threaded auger screw sections mounted on said shaft, the ends of each auger screw section terminating in substantially straight edges and one end of each section terminating over the openings in said hopper and in staggered relation with each other, the opposite ends of said sections terminating substantially midway between said openings, the substantially straight edges of said sections being so arranged as to contact and crush lumps of material against the sides of said hopper, a shaft rotatably mounted in said housing below said hopper, a plurality of oppositely threaded auger screw sections mounted on said shaft, the ends of each auger screw section terminating in substantially straight edges with one end of each section terminating under an opening in said hopper and the other end terminating over the opening in the housing and in staggered relation with each other, and means for rotating the upper and lower auger sections, the lower auger screw rotating at a slightly greater speed than the upper auger screw and the upper screw having longer leads to move the fertilizer faster than the lower auger to keep said housing substantially full.

4. A fertilizer distributing apparatus comprising, a hopper having inclined walls converging downwardly terminating in a downwardly curved bottom, said bottom having a plurality of longitudinally spaced openings, a substantially cylindrical shaped housing extending longitudinally under the bottom of said hopper, said housing having its free ends turned upwardly at an angle forming shoulders and a longitudinal opening extending over the openings in the bottom of said hopper, said free ends of the housing extending upwardly along the inclined sides of said hopper, said housing having a plurality of longitudinally spaced openings in the bottom thereof in staggered relation to the openings in the bottom of the hopper, a shaft rotatably mounted in the hopper, a plurality of oppositely threaded auger screw sections mounted on said shaft, the ends of each auger screw section terminating in substantially straight edges and one end of each section terminating over the openings in said hopper and in staggered relation with each other, the opposite ends of said sections terminating substantially midway between said openings, the substantially straight edges of said sections being so arranged as to contact and crush lumps of material against the sides of said hopper, a shaft rotatably mounted in said housing below said hopper, a plurality of oppositely threaded auger screw sections mounted on said shaft, the ends of each auger screw section terminating in substantially straight edges with one end of each section terminating under an opening in said hopper and the other end terminating over the opening in the housing and in staggered relation with each other, and means for rotating the upper and lower auger sections, the lower auger screw rotating at a slightly greater speed than the upper auger screw and the upper screw having longer leads to move the fertilizer faster than the lower auger to keep said housing substantially full, rotation of said auger sections moving the fertilizer against said shoulders to pulverize the same.

5. Apparatus for dispensing fertilizer comprising a wheel borne frame, brackets at the respective ends of said frame, substantially cylindrical inturned flanges on the lower portion of said brackets, a hopper for the fertilizer having inclined walls converging downwardly terminating in a downwardly curved bottom, means securing the hopper at its respective ends to said brackets above said cylindrical flanges, said bottom having a plurality of longitudinally spaced openings therein, a substantially cylindrical-shaped housing having its respective ends secured to the inturned cylindrical flanges on said brackets below said hopper, said housing having free ends turned upwardly at an angle and a longitudinal opening extending over the openings in the bottom of said hopper, said free ends embracing the lower portions of the inclined sides of said hopper to strengthen the same, said housing having a plurality of longitudinally spaced openings in the bottom thereof in staggered relation to the openings in the bottom of said hopper, auger means in the bottom of said hopper and in said housing, and means operatively connected to both of said auger means and said wheels whereby movement of said apparatus over the ground will cause the auger means to rotate causing the fertilizer to move through said openings in the hopper and housing simultaneously.

References Cited in the file of this patent

UNITED STATES PATENTS

| | | |
|---|---|---|
| 1,691,563 | Burger | Nov. 13, 1928 |
| 1,880,840 | Currier | Oct. 4, 1932 |
| 1,947,379 | Cargill | Feb. 13, 1934 |
| 2,143,801 | Self | Jan. 10, 1939 |
| 2,442,743 | Webster | June 1, 1948 |
| 2,541,008 | Stahmer et al. | Feb. 6, 1951 |
| 2,594,687 | Scott | Apr. 29, 1952 |
| 2,632,584 | Zuber | Mar. 24, 1953 |